United States Patent [19]

Polk, Jr. et al.

[11] Patent Number: 5,772,818
[45] Date of Patent: Jun. 30, 1998

[54] APPARATUS FOR COLLECTION AND TRANSFER OF PARTICLES AND MANUFACTURE THEREOF

[75] Inventors: Lewis T. Polk, Jr., Bedford; Hugh Vartanian, Littleton; Phillip P. Brown, Westford; Walker M. Sloan III, Berlin, all of Mass.

[73] Assignee: Cytyc Corporation, Boxborough, Mass.

[21] Appl. No.: 592,010

[22] Filed: Jan. 26, 1996

Related U.S. Application Data

[62] Division of Ser. No. 285,416, Aug. 3, 1994, Pat. No. 5,503,802, which is a continuation of Ser. No. 843,571, Feb. 28, 1992, Pat. No. 5,364,597, which is a continuation-in-part of Ser. No. 668,892, Mar. 13, 1991, abandoned.

[51] Int. Cl.$^6$ .................................................. B32B 31/16
[52] U.S. Cl. ...................... 156/73.1; 156/86; 156/309.6; 264/445
[58] Field of Search .............................. 156/73.1, 69, 84, 156/85, 86, 292, 308.2, 308.4, 309.6; 264/442, 443, 445

[56] References Cited

U.S. PATENT DOCUMENTS

| | | | |
|---|---|---|---|
| 3,615,257 | 10/1971 | Frost et al. | 422/101 |
| 3,682,321 | 8/1972 | Smith | 210/477 |
| 4,066,359 | 1/1978 | Bucalo | 356/36 |
| 4,142,940 | 3/1979 | Modolell et al. | 195/139 |
| 4,184,961 | 1/1980 | Rynde et al. | 210/232 |
| 4,357,240 | 11/1982 | Mehra et al. | 210/455 |
| 4,406,786 | 9/1983 | Hein | 210/223 |
| 4,664,800 | 5/1987 | Raines et al. | 210/445 |
| 4,767,426 | 8/1988 | Daly et al. | 55/487 |
| 4,849,061 | 7/1989 | Reylea | 156/308.4 |
| 4,891,134 | 1/1990 | Vcelka | 210/359 |
| 4,921,677 | 5/1990 | Hinckley et al. | 422/103 |
| 4,927,604 | 5/1990 | Mathus et al. | 422/101 |
| 5,011,555 | 4/1991 | Sager | 156/73.1 |
| 5,061,621 | 10/1991 | Perlman | 435/30 |

FOREIGN PATENT DOCUMENTS

| | | |
|---|---|---|
| 0 261 676 | 3/1988 | European Pat. Off. . |
| 0 503 128 | 9/1992 | European Pat. Off. . |
| 25 41 000 | 11/1976 | Germany . |
| 38 29 028 | 3/1989 | Germany . |
| 2 043 478 | 10/1980 | United Kingdom . |

OTHER PUBLICATIONS

Costar® Product Catalog Featuring "Cell Culture, Liquid Handling, Immunology, and General Laboratory," pp. 1–31.
Polyfiltronics Brochure, "Solve Your Separation Problems with Unique Membrane Encapsulation".
Amicon®, "Laboratory Separation, Membrane Filtration Chromatography", Pub. No. 533, pp. 1–76, (1988).

*Primary Examiner*—James Sells
*Attorney, Agent, or Firm*—Testa, Hurwitz & Thibeault LLP

[57] ABSTRACT

A device for collecting particles, such as human cells, from a fluid sample, and for transferring the collected particles to a receiver, such as a glass microscope slide, provides substantially exact replication of the spatial distribution of the cells on the collection device. The device supports a surface-collecting filter on a tubular rim, with a precise degree of flatness, and fastens the filter in place at a mounting shoulder recessed below the rim. Distortions of the mounting shoulder or of the filter at the mounting shoulder, caused by securing the filter to the shoulder, are confined to the shoulder structure, and do not detract from the desired precision flatness of the filter and rim structure.

9 Claims, 5 Drawing Sheets

APPARATUS FOR COLLECTION AND TRANSFER OF PARTICLES AND MANUFACTURE THEREOF

This application is a divisional application of Ser. No. 08/285,416 filed on Aug. 3, 1994, U.S. Pat. No. 5,503,802 which is a continuation of application Ser. No. 07/843,571, filed Feb. 28, 1992, U.S. Pat. No. 5,364,597, which is a continuation-in-part of the commonly assigned application Ser. No. 07/668,892, filed Mar. 13, 1991 abandoned.

BACKGROUND

This invention relates to a device for collecting microscopic particles, such as cells, from a fluid medium and for transferring the collected cells to a receiver, such as a glass microscope slide. The device collects the cells with a desired spatial distribution, and enables the cells to be transferred to the receiver with that same spatial distribution.

A collection and transfer device according to the invention is useful in the performance of cytological procedures. In a typical cytological procedure, cells are collected from a liquid containing sample cells to be examined, and are transferred onto a microscope slide or other receiver for viewing and evaluation.

Cytological examination typically requires that the cells on the microscope slide be in a single layer and be separated from one another, i.e. dispersed. In some practices, the cells are counted, so that a generally known quantity of the cells is examined.

One prior device for collecting a dispersed monolayer of cells, and for transferring them to a microscope slide for examination, has a surface-collecting filter spanning an end of a tube. To collect cells, that end of the tube is immersed in a liquid that contains cells to be examined. A vacuum is applied to the tube to aspirate liquid through the filter. This flow of aspirated liquid into the tube deposits cells on the outer side of the filter. Each cell on the filter obstructs further flow of liquid through the filter, and therefore the cells collect on the filter with a generally dispersed and single layer spatial distribution. The filter is subsequently placed against the microscope slide to transfer the collected cells to the slide with that same spatial distribution. A slight fluid pressure is preferably applied to the inner side of the filter to facilitate this transfer of the cells to the slide. The transfer process, in effect, "prints" the particles collected on the filter onto the viewing slide. Also, it generally is desired to use the filter device only once and then discard it, to avoid inter-sample contamination. Accordingly, it is desired that the filter device be suited for high volume manufacture at relatively low cost.

The pending and commonly assigned U.S. patent application Ser. No. 487,637 for "METHOD AND APPARATUS FOR CONTROLLED INSTRUMENTATION OF PARTICLES WITH A FILTER DEVICE" discloses a filter device of the above character for collecting cells from a sample liquid and with a desired spatial distribution. That application for patent, and the pending and commonly assigned U.S. patent application Ser. No. 550,142 for "METHOD AND APPARATUS FOR PREPARING CELLS FOR EXAMINATION," disclose apparatus and procedures for performing cell collection with the filter device and for transferring the collected cells to a microscope slide with the desired dispersed spatial distribution. The disclosures of both of these pending applications for patent, which use the terminology "screen filter" to designate a surface-collecting filter, are incorporated herein by this reference.

It has been found that not all the cells collected with the known filter device of the type described above transfer to the viewing slide. Instead, different ones of the filter devices transfer different portions of the collected cells. This loss of cells is undesirable, and the variations in the portion of cells that are transferred is also undesirable. The loss of transferred cells reduces the number of cells available for inspection and it can result in a generally unknown quantity of cells being transferred to the glass slide.

It accordingly is an object of this invention to provide a device for the collection of cells and like particles from a fluid medium with a dispersed spatial distribution and for the transfer of the collected particles to a glass slide or like receiver with minimal loss of particles. It is also an object that the device facilitate transfer of the particles with faithful retention of the spatial distribution of the collected particles.

A further object is to provide a structure and manufacture for such a device so that different devices provide a consistent and uniform transfer of collected particles to the receiver.

The objects of the invention also include providing a particle collection and transfer device that can be placed automatically in a specified orientation and location, relative to lineal and rotational axis; and that can couple releasably and replaceably with fluid conduits.

Another object of the invention is to provide a particle collecting and transferring device of the above character that can be manufactured at relatively low cost. It is a corresponding object to provide a method for manufacturing such a device that can be practiced at relatively low cost.

Other objects of the invention will in part be obvious and will in part appear hereinafter.

SUMMARY OF THE INVENTION

A particle collecting and transferring device according to the invention can be used to transfer essentially all collected cells to a glass slide or other receiver, with faithful replication of the spatial distribution of the cells as collected. The device attains these objectives by disposing a filter of the surface-collecting type on a support body with a highly planar geometry. The filter collects the particles of interest on its outer surface. The planar disposition of the filter enables it to contact the receiver, such as a microscope slide, completely and uniformly, so that a consistent and high percentage of the collected particles transfer to the receiver. Further, the transferred particles have the same spatial distribution as they had on the filter prior to the transfer.

The invention stems from the finding that the prior structure and manufacture of the known filter device provided a surface-collecting filter that was not entirely flat, and from the finding that different ones of the device have filters that exhibit varying departures from flatness.

The invention thus provides a new structure for a device that collects particles such as cells from a fluid sample. The new structure enables the particle collecting device to transfer essentially all the collected particles to a microscope slide, and with a substantially exact replication of the spatial distribution that the cells had when on the collection device.

One embodiment of the new structure supports a sheet-like filter sheet, e.g. a pore membrane filter, on a planar tubular rim located at the end of a support body. The filter has a precise degree of flatness defined by the tubular rim. The new structure fastens the filter sheet to the support body at an annular surface recessed inwardly on the body below the rim. This new structure allows the filter to be attached to the support body with a low cost bonding technique, examples of which include thermal bonding, ultrasonic welding, and solvent bonding. Distortions of the mounting structure caused by the bonding technique are confined to the mounting surface, and do not detract from the desired precision flatness of the filter-positioning rim.

A preferred optional feature of the filter device is the provision of a barrier between the filter positioning rim and the mounting surface. The barrier retards a bonding effect, such as heat, that is developed in the bonding process from disturbing the rim, where it might cause undesired geometrical distortion. The barrier can also be configured to receive excess or dislodged material produced during the bonding procedure, so that such material does not detract from the precision disposition of the filter on the rim. One embodiment of such a barrier structure is an annular trough on the support body located between the positioning rim and the mounting surface. The trough is geometrically disposed to have a depth dimension that increases the conduction path length between heat generated at the mounting surface and the positioning rim.

It is accordingly one feature of the invention to provide a particle collecting and transferring device that has a planar surface-collecting filter on a support body. The support body preferably is a tubular body that mounts the filter on a planar rim at one end. The body has an annular mounting surface disposed radially outward of the rim and axially inward on the body from the rim. The mounting surface preferably is generally parallel to the rim.

A further feature of the apparatus is a surface-collecting type filter having a first portion spanning the tubular body and seated on the rim for disposition in the plane defined by the rim. The filter first portion thus has an outer surface, facing outwardly from the tubular body, on which microscopic particles carried in a fluid can be collected, and from which such collected particles can be transferred to a receiver such as a microscope slide. The receiver is brought into abutment with the particle-carrying outer surface of the filter first portion to effect that transfer of the collected particles.

The features of the collecting and transferring device further include a mounting portion of the filter peripheral to the first portion and that is secured to the annular mounting surface, and thereby attached to the support body.

The structure for securing the mounting portion of the filter preferably includes a bond, between the material of the tubular body and the material of the filter. That bond typically is a substantially solid bonding flow of material produced with a technique such as ultrasonic welding, thermal bonding, or solvent bonding.

It is also a feature of the collecting and transferring device to provide a distortion barrier between the planar rim and the mounting surface. The barrier isolates the rim from material-distorting action developed during the attachment of the filter to the mounting surface. The barrier in a preferred embodiment is formed by an annular trough on the housing body and disposed between the rim and the mounting surface and having a depth dimension extending longitudinal to the axis of the tubular body.

In one embodiment, the new structure features a tubular support body having opposed axial ends, a first of which is open and a second of which is closed. A planar rim as described above is disposed at the open axial end for supporting a filter element in a planar orientation. An annular mounting surface is located on the periphery of the tubular support body between the axial ends for receiving a portion of the filter element to secure the filter element to the tubular support body.

An advantageous feature of this embodiment of the invention is that a fluid coupling element is provided, between the axial ends, for effecting a removable and replaceable connection to a pressure control source. This allows the particle suspending fluid to be drawn through the filter element, into the tubular support body, to trap particles against the outer surface of the filter element. Orienting means are provided for orienting the coupling means for alignment with the pressure control source connection.

A benefit derived from this embodiment of the invention is improved intra-sample isolation of the particle processing instrument with which the new particle collecting and transferring device is used. That is, because one axial end of the tubular support body is closed, particle suspending fluid drawn into the body, i.e., filtrate, does not come into contact with the particle processing instrument. Moreover, after the collected cells are transferred from the surface-collecting filter element the filtrate can be blown back through the filter element out of the tubular support body. Due to this feature of the invention the particle processing instrument with which the new particle collecting and transferring device is used does not need to have a waste disposal circuit.

The foregoing and further features of the invention attain a highly planar surface-collecting filter for the collection of particles from a fluid and for the precise uniform abutment with a microscope slide or other receiver, so that a consistent and maximal portion of the collected particles can readily be transferred to that receiver, and with a maximal retention of the spatial distribution that the particles had on the filter.

Further, the device can be manufactured at relatively low cost and in high volume. This is desirable to enable a fresh device to be used with each cytological sample being processed, and thereby to avoid intersample contamination.

One preferred method of manufacture thermally bonds the membrane filter to the annular mounting surface of the tubular body. A preferred thermal bonding operation employs a heated tool that presses the filter membrane against the annular mounting surface, which is thermoplastic, and melts the mounting surface sufficiently to embed the filter membrane. Upon cooling, the thermoplastic material of the mounting surface provides a secure mechanical bond of the filter membrane to the tubular body.

It is also preferred that the membrane filter be sufficiently taut to be free of wrinkles or puckers, and to have effectively no sag. The membrane material can be stretched to have this desired tautness concurrent with or subsequent to the bonding to the support body. A further preferred practice according to the invention is to employ a heat-shrinkable material for the membrane filter, and to subject it to sufficient heat to shrink it to attain the desired degree of stretch. Preferred materials for manufacture with a successive thermal bonding step and a subsequent heat shrink are to use a polycarbonate filter and a tubular body formed of polystyrene.

The invention accordingly comprises the features of construction, combinations of elements and arrangements of parts exemplified in the constructions hereinafter set forth, and comprises the several steps and their relation of one or more of such steps with respect to each of the others for fabricating such a structure, all as exemplified in the following detailed disclosure, and the scope of the invention is indicated in the claims.

BRIEF DESCRIPTION OF DRAWINGS

For a full understanding of the nature and objects of the invention, reference is to be made to the following detailed description and the accompanying drawings, in which.

DESCRIPTION OF ILLUSTRATED EMBODIMENTS

Figure 1:
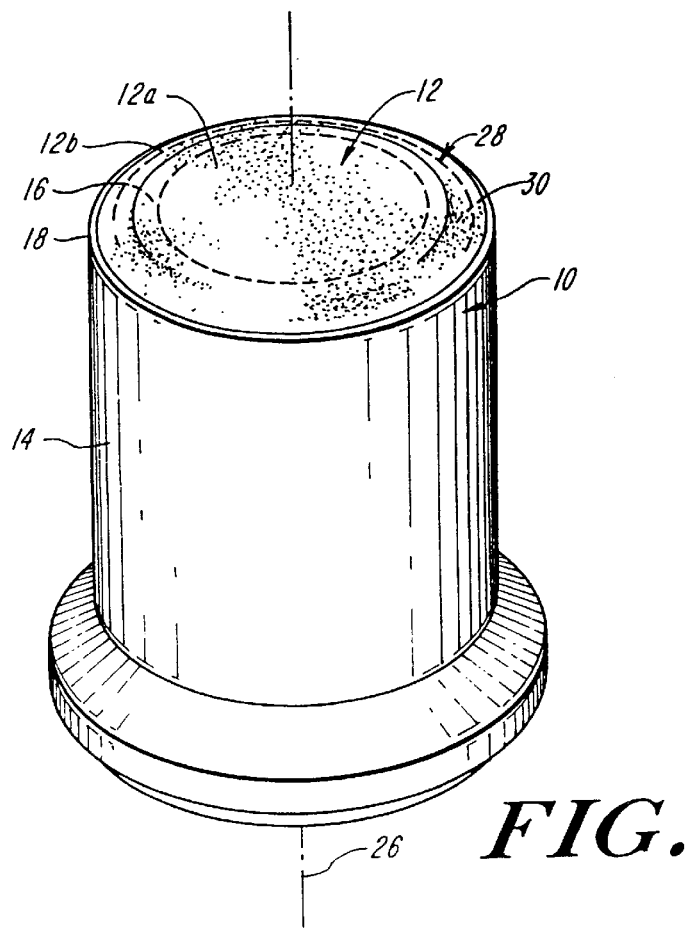
FIG. 1 is a perspective view of one embodiment of a collection and transfer device according to the invention.
Figure 2:
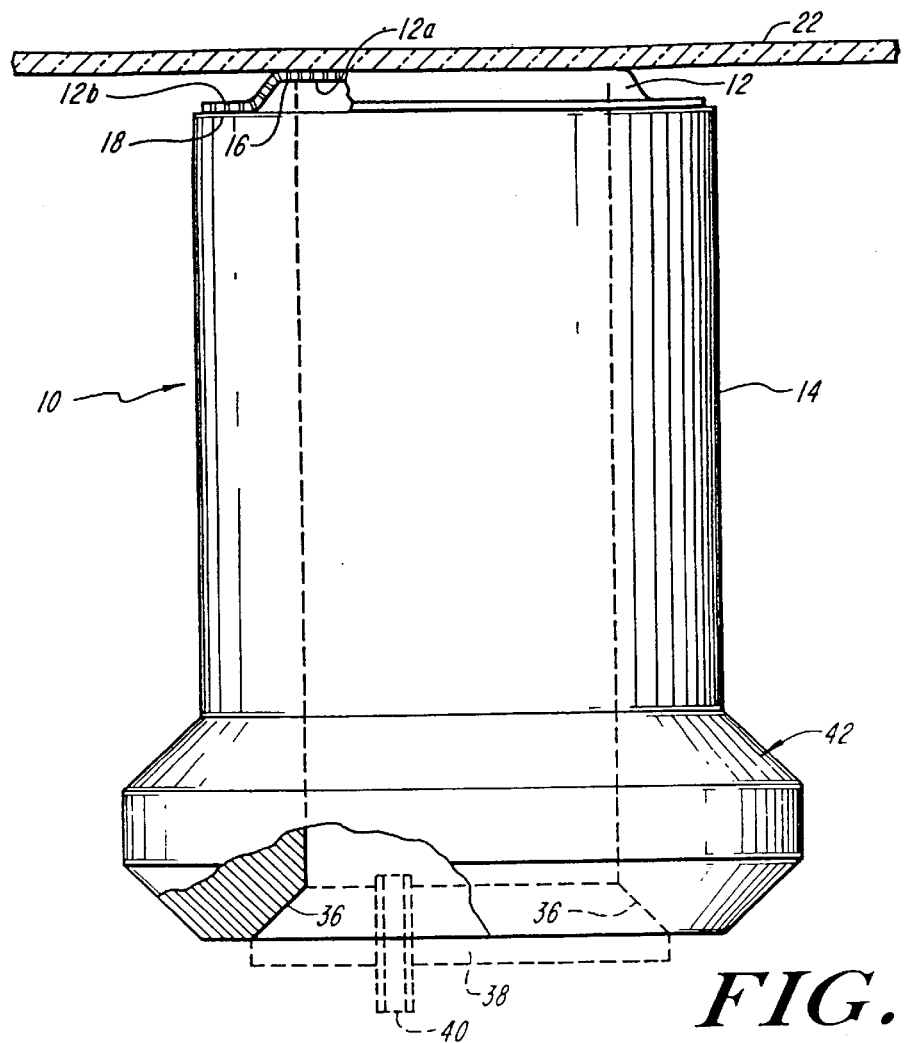
FIG. 2 is a side elevation view, partly in section, of the device of FIG. 1.

FIGS. 1 and 2 show a particle collecting and transfer device 10 according to the invention with a surface-collecting filter 12 mounted on a tubular body 14. The illustrated filter is a known pore membrane structure. A rim 16 at one end of the body 14 positions a central portion 12a of the filter in a flat configuration, i.e. planar, and the filter is secured at a peripheral portion 12b to a mounting surface 18 that is recessed inwardly on the body 14 from the rim 16.

The structure isolates the rim 16, so that it can position the filter with precision, from the location of the attachment of the filter to the body, i.e. from the mounting surface 18. Distortions of the mounting surface due to the mode of attachment thus do not alter the precise positioning geometry of the rim 16. As a result, the filter central portion 12A can have a precision planar disposition. When a glass microscope slide 22, shown in phantom in FIG. 2, is brought into contact with the filter central portion 12a, essentially the entire filter central portion abuts the microscope slide. This substantially uniform abutment enables collected particles located throughout the entire surface of the filter central portion to be transferred directly to the microscope slide. There is essentially no loss of particles remaining on the filter, and the particles transfer with the same spatial distribution that they had on the filter.

More particularly, the illustrated tubular body 14 has a cylindrical wall 24 extending along an axis 26. The positioning rim 16 is at one axial end of the inner surface of the cylindrical wall 24. The annular end face 28 of the cylindrical wall 24 at that axial end, of which the radially inner portion forms the positioning rim 16, is axially recessed at a location radially outward of the positioning rim 16 to form the mounting surface 18. The illustrated mounting surface 18 is thus an annular surface concentric with the annular positioning rim 16 and is axially spaced from the rim inwardly on the body 14.

Figure 3:
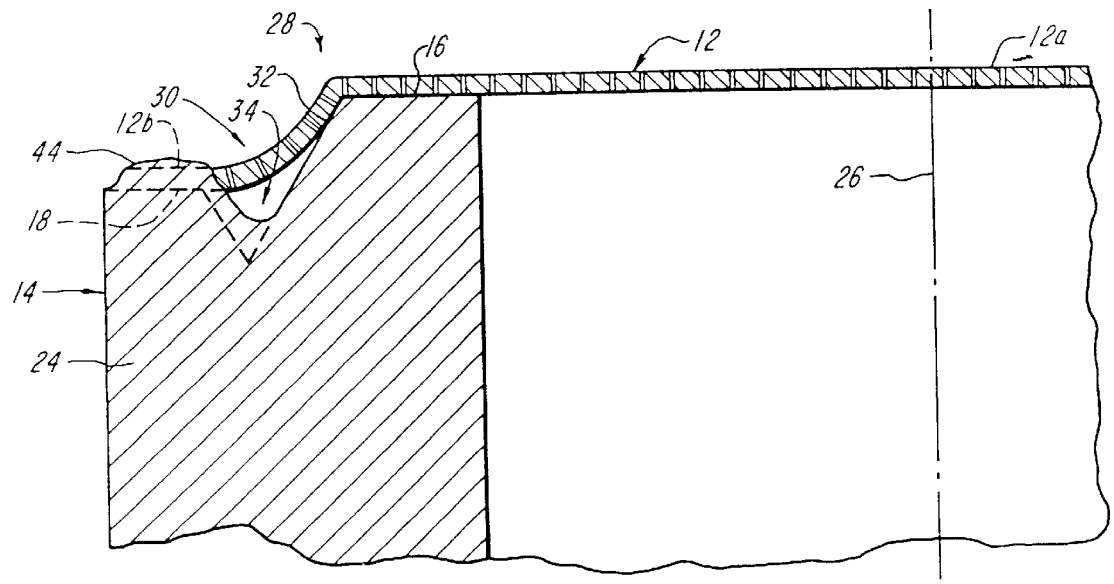
FIG. 3 is an enlarged fragmentary detail of FIG. 2, without the viewing slide.

As shown in FIGS. 1 and 2 and in detail in FIG. 3, a preferred yet generally optional structural feature of the device 10 is a barrier indicated generally at 30 on the body 14 and interposed between the positioning rim 16 and the mounting surface 18. The illustrated barrier 30 includes an annular trough 34 oriented so that the depth dimension extend longitudinal to the axial spacing between the rim 16 and the mounting surface 18. Correspondingly, the width of the illustrated barrier trough 34 extends in the radial direction, and is interposed radially between the rim 16, which is radially inward from the barrier, and the mounting surface 18, which is radially outward from the barrier.

The barrier 30 also includes the collar-like axially-extending wall 32 that extends on the body 14 between the positioning rim 16 and the mounting surface 18.

The barrier 30, and particularly the trough 34, present a long thermal conduction path that isolates any heat developed at the mounting surface 18, during attachment of the filter thereto, from distorting or otherwise geometrically altering the positioning rim 16. This long path also retards solvent action, when solvent bonding is used, from deforming the rim 16. Further, the void formed by the barrier trough 34 provides a receptacle for trapping and otherwise receiving debris and other excess or flowing material produced during the bonding or other attachment of the filter peripheral portion 12b to the mounting surface 18. The barrier 30 thus substantially isolates the positioning rim from distortion and from material debris that might otherwise alter or otherwise detract from the desired highly planar surface which the positioning rim defines.

Further structure of the illustrated device 10 includes, adjacent its other axial end, a seat 36 that seals removably and replaceably with a cover plate 38 fitted with a through conduit 40. The cover plate can fit with the cylindrical wall 24 of the seat 36 to provide a fluid tight seal closing that end of the tubular body 14, except for the aperture which the conduit 40 provides.

As also shown in FIGS. 1 and 2, the illustrated device 10 has an outwardly projecting mounting and drive hub 42 disposed adjacent the sealing end of the body 14. As described further in the co-pending applications for patent noted above, the device 10 can be mounted in an instrument by way of the positioning hub 42 and rotated by way of idler rollers that engage the hub 42. The device 10 can, in addition, be sealed closed in the instrument by way of the cover plate 38, with the only openings being by way of the conduit 40 and the filter central portion 12a. When the device is inverted from the position shown in FIGS. 1 and 2 and the lower, filter-carrying end is immersed in a liquid sample containing particles, a vacuum applied to the conduit 40 aspirates liquid into the interior of the tubular body 14 and, in the process, collects particles carried in the liquid onto the outer surface of the filter central portion 12a.

As further described in the noted co-pending applications for patent, the device 10 with particles on the outer surface of the filter central portion 12a, after removal from the particle containing liquid, can be placed in abutment with a microscope slide 22, as illustrated in FIG. 3. The cells or other particles collected on the filter are transferred to the glass slide. The transfer of particles from the filter to the microscope slide can be facilitated by applying an elevated pressure to the inner side of the filter portion 12a.

With further reference to FIGS. 1, 2, and 3, the filter 12 is secured to the tubular body 14 by way of attachment of the peripheral portion 12b to the mounting surface 18. A preferred attachment is obtained by heat staking the filter peripheral portion to the material of the tubular body at the mounting surface 18. As described below in greater detail, with this fabrication process after the filter 12 is positioned on the rim 16 of the cylindrical wall 24 of the tubular body 14, a heated ram is brought into selected pressure contact with the filter peripheral portion 12b, pressing it against the mounting surface 18. The heat radiated by the ram creates a bonding flow of material of the tubular body 14 that bonds the filter peripheral portion to the mounting surface. The resultant bond 44, FIG. 3, preferably is both mechanical and intermolecular, upon solidification of the flowed material.

Alternative techniques for securing the filter 12 to the mounting surface 18 include ultrasonic welding and solvent bonding. These techniques are generally known in the art.

With a preferred practice of the invention the cylindrical wall 24 of the tubular support body 14 is molded from polystyrene resin marketed by the Dow Chemical Company under the designation Styron 685D. The filter 12 is a polycarbonate membrane treated with a wetting agent, as commercially available from manufacturers to be hydrophilic, and heat staked to the tubular body 14 as described below. As mentioned, however, the filter 12 can also be ultrasonically bonded to the tubular body 14. A suitable ultrasonic bonding process is available from Polyfiltronics, Inc. of Rockland, Mass. 02370. The porous membrane that forms the filter 12 in this example is in the order of seven microns thick, and is available commercially from Poretics Corporation, Livermore, Calif. 94550, and from Nuclepore Corporation, Pleasonton, Calif. 94566.

As noted above, material distorting affects developed at the mounting surface 18 during this securing of the filter peripheral portion to the mounting surface, including for example heat and solvent action, are isolated from the positioning rim 16 by way of the barrier 30 and including the trough 34. Further, material that becomes fluid or otherwise dislodged during the mounting process—such as material of the filter and/or of the tubular body cylindrical wall—, and which tends to move radially inwardly on the annular mounting surface 18, is trapped or otherwise received in the barrier trough 34. The trough thus prevents such material from being deposited on, or otherwise distorting or disfiguring, the positioning rim 16. The barrier 30 thus ensures that the rim 16 positions the filter central portion 12a with the desired shape or contour, e.g., planar flatness.

Figure 4:
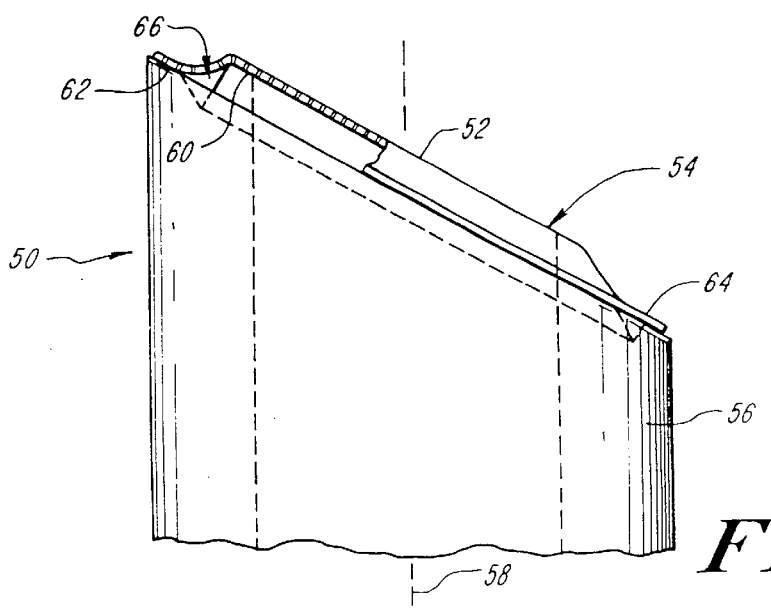
FIG. 4 is a fragmentary side elevation view, partly in section of another collection and transfer device according to the invention.

FIG. 4 shows another device 50 according to the invention and having an oval-shaped portion 52 of a filter 54 for collecting particles and for transferring them to a receiver such as a viewing slide. The device 50 has a tubular support body 56, elongated along an axis 58, and forms an eliptical filter-positioning rim 60. The rim is flat, i.e. planar, and is in a plane that extends diagonally across the circular cross-section of the illustrated body 56.

Axially-spaced inwardly on the tubular body 56 from the rim 60 is a mounting shoulder 62 that projects radially outward on the tubular outer wall of the body 56. The shoulder forms an annular mounting surface to which a peripheral portion 64 of the filter 54 attaches, for attaching the filter to the body. The illustrated mounting surface is oval-shaped, i.e. eliptical, and is preferably generally parallel to the positioning rim 60.

The device 50 also has a barrier trough 66 that axially recesses the mounting surface formed by the shoulder 62. The trough is at a radially inner location on the shoulder, adjacent the tubular wall of the body 56.

The filter 54 is attached to the body 56 by securing the peripheral portion 64 to the mounting surface formed by the shoulder 62. The method of securing can employ a technique such as ultrasonic welding, thermal bonding or solvent bonding. The further structure and method of manufacture for the device 50 can be in accord with the preceding description, including the description of the device 10 shown in FIGS. 1–3.

Figure 5A:
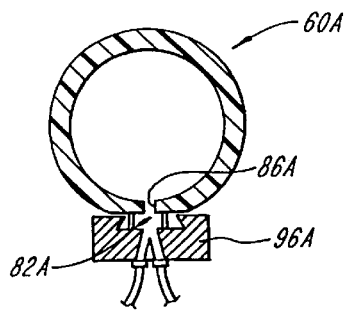
FIG. 5A is a cross-sectional view taken along line A—A of a portion of another embodiment of the device shown in FIG. 5.
Figure 5:
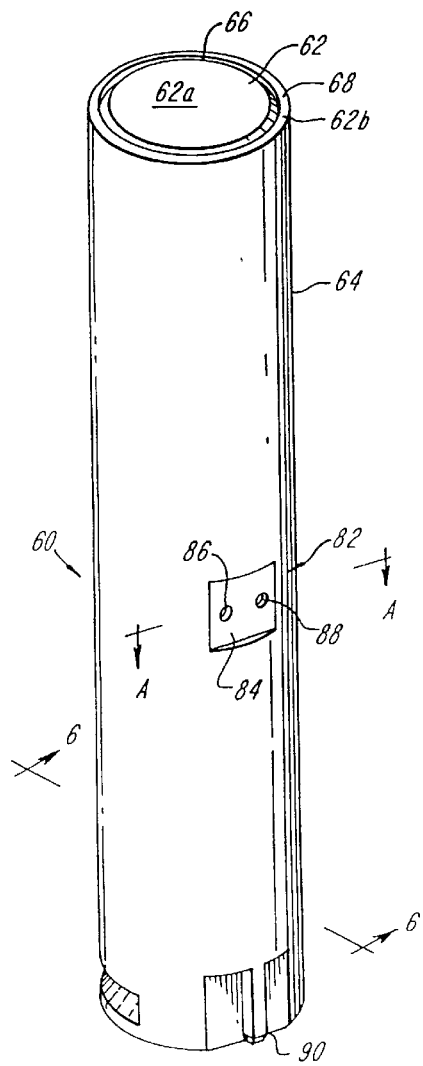
FIG. 5 is a perspective view of still another embodiment of a collection and transfer device according to the invention.
Figure 6:
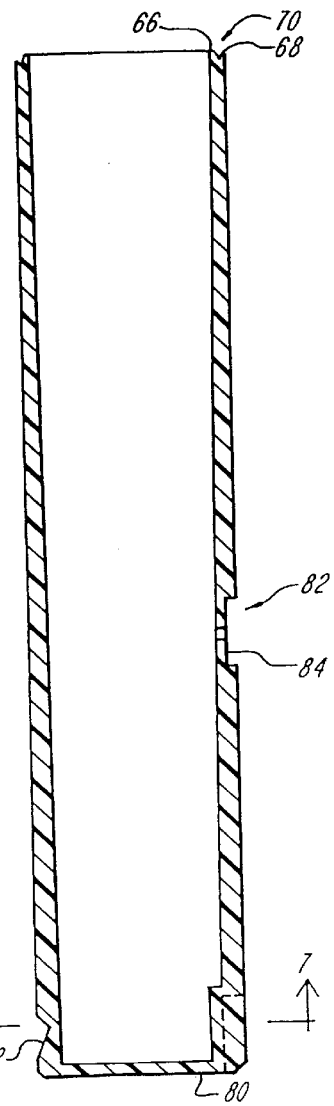
FIG. 6 is a cross-sectional view taken along line 6—6 of FIG. 5.
Figure 7:
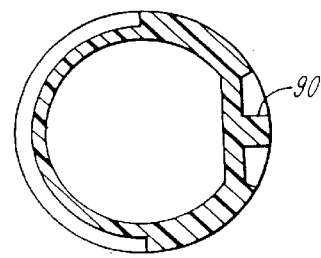
FIG. 7 is a cross-sectional view taken along line 7—7 of FIG. 6.

FIGS. 5–7 show another device 60 according to the invention with a surface-collecting filter 62 mounted on a tubular body 64. As with the embodiments of the invention shown in FIGS. 1 through 4, a rim 66 at an open end of the body 64 positions a central portion 62a of the filter in a planar configuration. The filter 62 is secured at a peripheral portion 62b to a mounting surface 68 that is recessed inwardly on the body 64 from the rim 66. Also, the device 60 includes a barrier, generally shown at 70, on the body 64 which is interposed between the positioning rim 66 and the mounting surface 68. The features and advantages of the barrier 70 are similar to those of barrier 30 discussed above as they relate to the device 10.

Differently from the previously described embodiments of the invention, however, as shown in FIG. 6, the tubular body 64 is closed at its axial end 80 spaced from the rim 66. Additionally, the body 64 has a fluid coupling 82 for enabling a pressure to be applied across the filter 62, as used for the collection and the transfer of particles.

In the illustrated embodiment, having a hollow cylindrical body 64, the coupling 82 includes a sealing surface 84 and one or more apertures. The illustrated sealing surface is a flat, i.e., planar, surface on the exterior wall of the body 64.

It should be understood, however, that the sealing surface 84 can take other forms such as, for example, conical or spherical. Any surface adapted for providing a fluid-tight seal is suitable. The apertures 86 and 88 extend through the wall of the body 64 from the sealing surface 84 to enable the fluid couplings of an external pressure source (not shown) to be removably and replaceably placed in abutment with the surface 84 and thereby to couple fluid pressure to the interior of the body 64 by way of each passage formed by each aperture 86 and 88. Typically, one aperture 86, 88 serves as a pressure control port while the other serves as a pressure monitoring port.

As mentioned above, however, it is not necessary that coupling 82 have two apertures 86 and 88. Indeed, as shown in FIG. 5A, a device 60A can be formed with a coupling 82A having only one aperture 86A. In this embodiment, as described below in greater detail, a coupling block 96A of a particle processing instrument can interact with the coupling 82A to place pressure monitoring and control sources (not shown) in fluid communication with the aperture 86A.

In either configuration, the sealing surface 84 provides a surface receptive to a fluid-tight connection with pressure control and monitoring source connections. Accordingly, the general concepts of particle collection and transfer pertaining to the above discussed embodiments of the invention are also applicable to the device 60.

A further feature of the device 60 is embodied in the closed axial end 80 and the intermediately disposed pressure source coupling 82. These features improve the intra-sample isolation of the particle processing instrument with which the device is used. That is, by eliminating the need for a cover plate 38 (FIG. 2), such as is required by devices 10 and 50, the likelihood of inter-sample contamination is diminished. The device 60 is entirely self-contained.

Additionally, after the collected cells are transferred from the surface-collecting filter element, fluid drawn into the body, i.e., filtrate, can be blown back through the filter element out of the tubular support body. In this manner, a particle processing instrument with which the particle collecting and transferring device 60 is used does not need to have a waste disposal circuit because after cell collection and transfer, filtrate can be returned, as discussed above, to the sample vial.

Another feature of the device 60 is that the coupling 82 is located on the tubular body 64 spaced from both axial ends by distances greater than a maximum liquid depth to be drawn into the body 64 in accordance with the particle collection and transfer operations described above. Accordingly, whatever the vertical orientation of the device 60, whether axial end 80 up during particle collection, or filter end up during particle transfer as in FIGS. 5 and 6, the coupling 82 is vertically above the liquid in the tubular body 64. The pressure source connection applied to the coupling 82, therefore, can be isolated from the liquid sample. This further serves to protect the integrity of individual samples.

With further reference to FIGS. 5, 6, and 7, the illustrated device 60 includes an orienting key 90 and a holding recess having an angled detent surface 92, both on the outer wall of the body and adjacent the closed axial end 80. While the illustrated holding recess employs an angled detent surface 92 for releasably engaging an external clamping member to hold the device 60 axially, the detent surface 92 is not required. The illustrated key 90 is circumferentially aligned—or otherwise selectively located—with respect to the coupling 82 so that a particle processing instrument can selectively rotationally orient the body 64 about its axis of elongation, and hence in the horizontal plane of FIG. 7, to align the coupling 82 with external pressure control and monitoring source connections.

Figure 8:
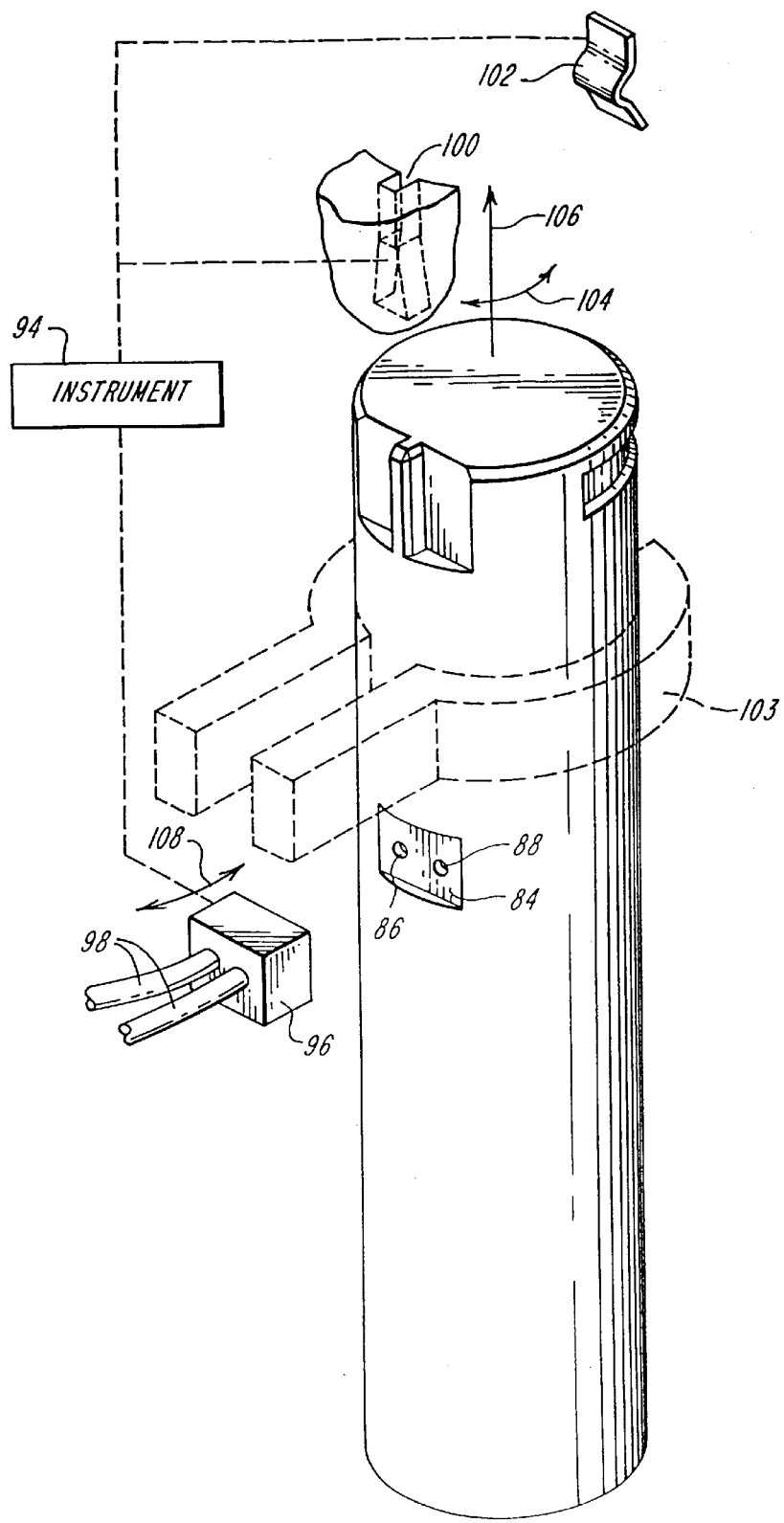
FIG. 8 is a schematic representation of an instrument that operates with the device of FIG. 5.

The coupling 82, orienting key 90 and holding recess 92 facilitate using the device 60 in the automated collection and transfer of particles, as FIG. 8 shows. An automated instrument indicated generally at 94 has a coupling block 96 connected to pressure conduits 98, has a rotationally-orienting guide 100, and has a holding finger 102. In use, the device 60 is oriented with the closed end 80 uppermost, and raised axially, along arrow 106, to seat the key 90 in the guide 100 that fixes the orientation of the device rotationally along arrow 104. Continued upward movement of the device snap-fits the holding recess 92 with the finger 102, to hold the device 60 in place vertically. Other means for securing the device 60 will be apparent to those skilled in the art. By fixing the orientation of the device by seating the key 90 in the guide 100 the instrument 94 "knows" the position of coupling 82. The instrument can then manipulate the device 60 with a wrist 103 to locate the coupling 82 for ready alignment with the coupling block 96, which the instrument mounts as on an arm or other structure for movement along arrow 108 selectively into and out of fluid-tight engagement of the conduits 98 with the apertures 86 and 88.

One preferred embodiment of filter attachment involves a first thermal bonding step, wherein the filter is welded by heat to the rim of the support body. Then, to ensure appropriate tensioning of the filter so as to provide a uniformly planar surface, a second step of heat-shrinking the filter is employed.

Figure 9:
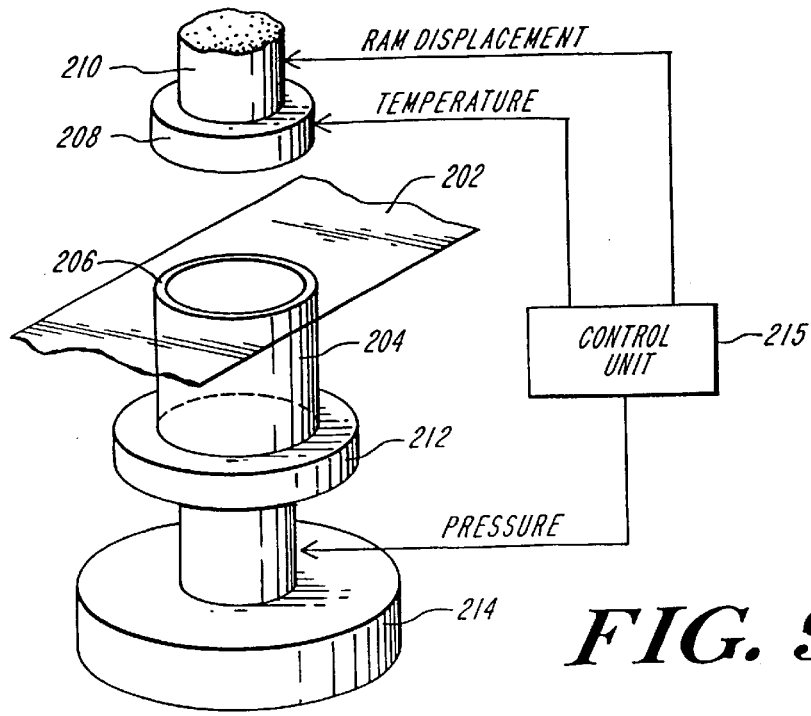
FIGS. 9 and 10 are schematic showings of a process for fabricating a device according to further features of the invention with successive thermal bonding and heat-shrink operations.

FIG. 9 shows fabrication apparatus used in one mode of attachment of a surface-collecting filter 202 to a tubular body 204 by way of a thermal-bonding process. In the fabrication, the surface-collecting filter 202 is disposed upon a rim 206 at one end of the tubular body 204. The illustrated thermal bonding fabrication equipment is essentially an arbor press with a heated ram 208. The ram tip 210, which is shaped like a horn or hollow tube having approximately the same diameter as the rim 206 of the tubular body 204, is pressed directly against the filter 202 and is maintained at a temperature capable of welding the filter 202 to the rim 206 of the body 204. The ram tip temperature preferably is controlled, for instance, with digital control to obtain ±1° F. accuracy.

The contact pressure between the ram tip 210, the filter 202, and the rim 206 is controlled, in the illustrated equipment, by supporting the body 204 on an air cylinder 212 mounted on the press base 214. The press ram 208 is lowered until it engages a stop. The air cylinder 212 on the base then takes up the load. The load can be set by varying the pressure to the air cylinder 212. The dwell time of the bonding step, i.e., the time the ram tip 210 remains pressed against the filter 202 and rim 206, can be controlled by timing and reversing the direction of the air cylinder 212 to remove the load and heat on the rim 206 and filter 202. For instance, a limit switch (not shown) can activate a timer when the arbor ram 208 hits a stop, to determine the dwell time of the ram tip 210 against the filter 202 and rim 206.

A control unit 215, also shown in FIG. 9, can provide control of the ram tip temperature, compression force and dwell time. The control unit is preferably driven by a microprocessor, with connections to a pressure sensing unit in the air cylinder 212, a temperature sensing unit in the ram tip 210 and a microswitch activated by the ram 208 engaging its stop. A control unit 215 for this purpose can be provided by those skilled in the art using known techniques.

Upon lowering of the ram 208 and engagement of the stop, the control unit 215 actuates a pneumatic pump or compressed air source connected to the air cylinder 212. The control unit monitors and adjusts the pressure to the air cylinder such that it matches the desired compression force when the ram tip is contacted by the filter and body. The dwell time of this contact is determined relative to the contacting of the stop by the ram, or alternatively, it can be relative to the achievement of a set pressure value in the air cylinder 212. At the end of the predetermined dwell time, the control unit release the pressure in the air cylinder 212, thus removing the body and filter from the ram tip.

The control unit senses and adjusts the temperature of the ram 208 and ram tip 210 such that the desired ram tip temperature in maintained to within ±1° F.

The operating conditions for the thermal bonding step includes determining temperature, the dwell time, and the bonding force or pressure. For instance, increasing the temperature of the ram can generally be offset by decreasing the dwell time and the compression force, and vice-versa. The process is considered optimal when the cylinder melt is minimal, the wetting of the rim/filter interface is even, and the mechanical strength of the filter 202 bond to the body 204 is high. When the temperature, dwell time and load force parameters are too great, the result can be unwanted deformation of the rim 206. Conversely, when these parameters are too small, the resulting bond is weak and the filter delaminates more easily from the body 206. One particularly useful test of these process conditions comes from determining the quality of a slide produced by the deposition of sample material from the filter by the particle collecting-and-transfer device.

After the filter 202 is attached to the tubular body 204, the filter 202 is trimmed to approximate the diameter of the body 204. This eliminates excess filter material which might interfere with the particle collection and transfer process.

One preferred filter material for the illustrated thermal bonding fabrication method is polycarbonate, and one preferred material for the tubular body is polystyrene. The process parameters for the mechanical bonding of the polycarbonate filter to the polystyrene rim in the manner described above with the equipment of FIG. 9, are as follows:

| Ram Tip Temperature: | 275–350° F. |
|---|---|
| Compression Force | 20–60 lbs |
| Dwell time | .75 to 2.0 seconds |
| Ram Tip Configuration | Outer Dia. 1.0 in |
|  | Inner Dia. .89 in |

The melting point of polycarbonate is higher than that of polystyrene, therefore under these conditions, the heat from the ram tip, conducted through the filter, causes the rim 106 to melt and form a mechanical bond with the polycarbonate filter. One specific preferred combination of parameters for the thermally induced mechanical bonding of the filter to the body is:

| Ram Tip Temperature: | 350° F. |
|---|---|
| Compression Force | 40 lbs |
| Dwell time | .75 seconds |

Figure 10:
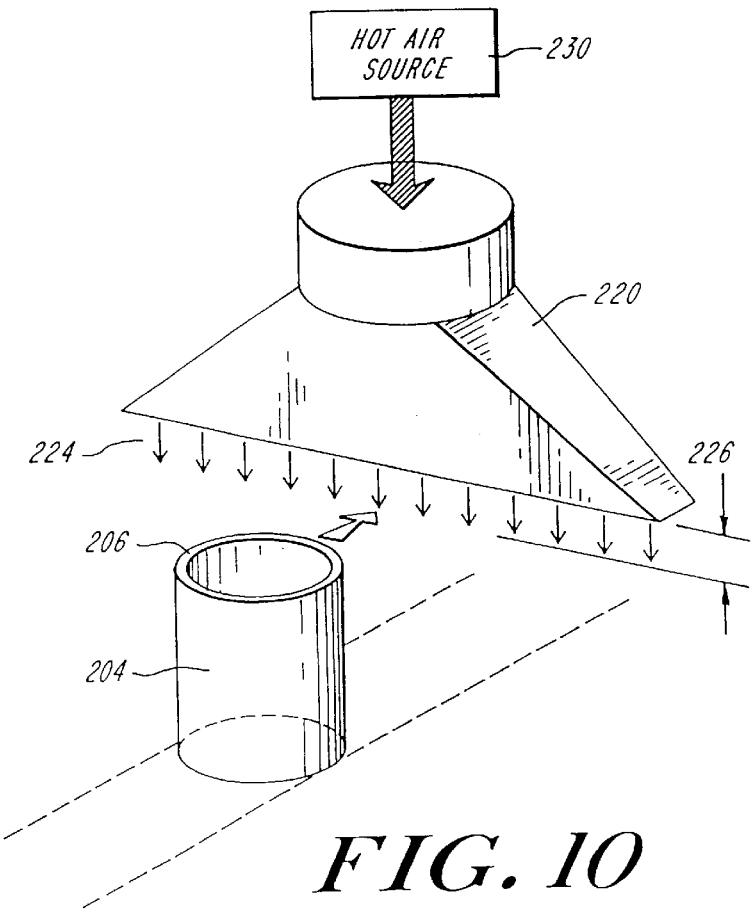

Furthermore, it has been found that the transfer of particles from the collection filter to a microscope slide is enhanced by performing a filter-shrinking step, preferably after the step of thermally bonding the filter to the tubular body. The filter-shrinking step uniformly tensions the filter to enhance the flat, wrinkle-free disposition of the filter on the body 206. Referring to FIG. 10, one apparatus for performing the filter-shrinking step uses a variable temperature hot air source 230, and a flow-directing baffle 220 to direct a hot air flow 224 onto the filter 202 secured on the body 206. The tubular body 206, with the thermally bonded filter 202 is passed under the flow-directing baffle 220 of the hot air source at a controlled speed and a selected minimal spacing 226. The hot air temperature is maintained such that the filter 202 contracts and is tensioned substantially uniformly in all directions. To vary the duration of heat application, the speed at which the tubular body 204 is passed through the heat flow 224 can be varied. The duration of heat exposure is inversely proportional to the speed at which the cylinder is passed through the heat flow.

The process parameters for the heat-shrinking step carried out by the illustrated embodiment are:

| air temperature | 250–400° F. |
|---|---|
| duration of heat application (expressed in terms of cylinder speed) | 0.5 to 2.0 in/sec |

In one specific illustrative practice, the hot air source employed is a variable temperature hot air gun (Master Appliance, VariTemp Heat Gun VT 752C) and a flow directing baffle with output dimensions of 8 inches × 0.2 inches. The air temperature is maintained at 400° F., and the tubular body 104 is passed through the heated air flow at a speed of 1.3 inches per second. When the tubular body 104 is positioned directly beneath the flow directing baffle 220, the items are approximately 0.5 inches apart. Those skilled in the art will appreciate that other combinations of parameter values can be used.

It will thus be seen that the invention efficiently obtains the objects set forth above, among those made apparent from the previous description. Since certain changes may be made in carrying out the above process or in the device set forth without departing from the scope of the invention, it is intended that all matter contained in the above description or shown in the accompanying drawing be interpreted as illustrative and not in a limiting sense.

It is also to be understood that the following claims are to cover all generic and specific features of the invention described herein, and all statements of the scope of the invention which, as a matter of language, might be said to fall there between.

Having described the invention, what is claimed as new and secured by letters patent is:

1. A method for fabricating a particle collecting device, comprising the steps of
   A. providing a tubular support body having a first axial end spaced from a second axial end,
   B. providing rim means at said first axial end, and providing an annular attachment means recessed inwardly on said body below said rim, and intermediate said axial ends,
   C. disposing a filter means on said rim means such that said particle-collecting portion of said filter is planar, and
   D. securing a peripheral securing portion of said filter means to said attachment means for attachment of said filter means to said body.

2. A method according to claim 1 wherein said securing step is carried out by a technique selected from the group ultrasonic welding, thermal bonding and solvent bonding.

3. A method according to claim 2 further comprising the step of shrinking said filter means such that said particle collecting portion of said filter means is uniformly tensioned, said filter-shrinking process being applied to said filter means subsequent to said securing step.

4. A method according to claim 2 further comprising the step of shrinking the filter means subsequent to said securing step, by which said particle collecting portion of said filter means is heated and caused to shrink such that said particle collecting portion of said filter means is uniformly tensioned.

5. A method according to claim 1 further including the step of providing, prior to said disposing and said securing steps, annular trough means on said body between said attachment means and said rim means.

6. A method according to claim 1 further including the step of providing barrier means disposed between said attachment means and said rim means.

7. A method according to claim 1 wherein said securing step produces heat at said attachment means and further comprising the step of isolating said rim means from deformation by such heat.

8. A method according to claim 1 wherein said securing step includes flowing material on said attachment means for bonding the peripheral portion of said filter means to said attachment means.

9. A method according to claim 8 wherein said flowing of material includes any one of a solvent bonding step, an ultrasonic bonding step and a thermal bonding step.

\* \* \* \* \*